United States Patent
Banister et al.

(10) Patent No.: US 6,567,390 B1
(45) Date of Patent: May 20, 2003

(54) ACCELERATED MESSAGE DECODING

(75) Inventors: Brian C. Banister, San Diego, CA (US); Roland R. Rick, San Diego, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/280,778

(22) Filed: Mar. 29, 1999

(51) Int. Cl.[7] .............................................. H04B 7/216
(52) U.S. Cl. ........................ 370/342; 370/335; 370/320; 370/208; 370/209; 370/441; 375/130; 375/262; 375/265; 375/340; 375/341
(58) Field of Search ................................ 370/342, 335, 370/441, 431, 310, 208, 209, 320; 375/140, 130, 146, 149, 342, 240, 262, 265, 340, 341; 455/69, 68; 714/794, 795

(56) References Cited

U.S. PATENT DOCUMENTS

| | | | |
|---|---|---|---|
| 5,109,390 A | 4/1992 | Gilhousen et al. ............. 375/1 |
| 5,440,597 A | 8/1995 | Chung et al. ............... 375/200 |
| 5,530,716 A | 6/1996 | Lipa ........................... 375/206 |
| 5,572,552 A * | 11/1996 | Dent et al. .................. 375/343 |
| 5,577,022 A | 11/1996 | Padovani et al. ............. 370/13 |
| 5,710,768 A | 1/1998 | Ziv et al. .................... 370/342 |
| 5,768,306 A | 6/1998 | Sawahashi et al. ......... 375/206 |
| 5,790,537 A * | 8/1998 | Yoon et al. .................. 370/342 |
| 5,831,978 A * | 11/1998 | Willars et al. .............. 370/335 |
| 5,949,814 A * | 9/1999 | Odenwalder et al. ....... 375/200 |
| 5,991,285 A * | 11/1999 | Ghosh ......................... 370/335 |
| 6,064,678 A * | 5/2000 | Sindhushayana et al. ... 370/470 |
| 6,088,347 A * | 7/2000 | Minn et al. ................. 370/342 |
| 6,147,964 A * | 11/2000 | Black et al. ................ 370/209 |
| 6,173,007 B1 * | 1/2001 | Odenwalder et al. ....... 375/146 |

* cited by examiner

Primary Examiner—Edward F. Urban
Assistant Examiner—Marceau Milord
(74) Attorney, Agent, or Firm—Mitchell, Silberberg & Knupp, LLP (57) ABSTRACT

A message that has its energy spread over a frame of encoded data is decoded. First, encoded data are received so as to obtain a quantity of the encoded data that is less than all the encoded data in the frame and also is less than all the encoded data representing the message. Then, the quantity of encoded data received is supplemented, without receiving additional encoded data, so as to obtain a frame of data. Typically, the data will be supplemented by zero padding the data, such as by initializing a frame buffer to all zeros and then overwriting the zero data with actual data as it is received. Finally, ordinary frame decoding is performed on the frame of data so generated, in order to decode the message.

20 Claims, 4 Drawing Sheets

ACCELERATED MESSAGE DECODING

BACKGROUND OF THE INVENTION

1. Field of the Invention

The present invention generally concerns accelerated message decoding, and is particularly applicable to message decoding in a slotted paging mode of a code division multiple access (CDMA) cellular communications system.

2. Description of Related Art

In wireless communications technology, user data (e.g., speech, signaling messages, alphanumeric data) modulate a radio frequency signal for transmission and reception between a base station and a mobile unit. The radio spectrum allocated by regulatory authorities for a wireless system is "trunked" to allow simultaneous use of a spectrum block by multiple units.

The most common form of trunked access is the frequency-division multiple access (FDMA) system. In FDMA, the spectrum is divided into frequency channels comprised of distinct portions of the spectrum. The limited frequency channels are allocated to users as needed. However, once a frequency channel is assigned to a user, that frequency channel is used exclusively by the user until the user no longer needs the channel. This limits the number of concurrent users of each frequency channel to one, and the total number of users of the entire system, at any instant, to the number of available frequency channels. In addition, a single user generally will not at all times use the full capacity of the channel assigned to him. Accordingly, obtaining maximum efficiency of the available resources is difficult to achieve using FDMA solely.

Another common trunking system is the time-division multiple access (TDMA) system. TDMA is commonly used in telephone networks, especially in cellular telephone systems, in combination with an FDMA structure. In TDMA, data are digitized and compressed to eliminate redundancy, thus decreasing the average number of bits required to be transmitted and received for the same amount of information. The time line of each of the frequency channels used by the TDMA system is divided into "frames" and each of the users sharing the common channel is assigned a time slot within the frames. Each user then transmits or receives a burst of data during its assigned time slot and does not transmit or receive during other times. With the exception of delays required by the burst data transmission, which typically are small enough to be largely unnoticeable, the TDMA system will appear to the users sharing the frequency channel to have provided an entire channel to each user.

The FDMA and TDMA combination technique is used by the GSM (global system for mobile communications) digital cellular system. In GSM, each channel is divided up in time into frames during which eight different users share the channel. A GSM time slot is only 577 μs (microseconds), and each user gets to use the channel for 577 μs out of every 4.615 ms (millisecond) time interval. 577 μs*8=4.615 ms.

Yet another method for sharing a common channel between multiple users is the code division multiple access (CDMA) technique which uses direct sequence spread spectrum modulation. CDMA is relatively new to cellular technology and is one of the accepted techniques to be included into the next generation of digital cellular systems in the United States. Several different CDMA standards have evolved. The specific combination of features described in the following discussion pertains mainly to the forward link of the IS-95B CDMA standard.

As with TDMA, the CDMA systems are typically used in conjunction with a FDMA structure, although this is not required. However, unlike the TDMA system, the CDMA system generally does not separate the multiple users of a common frequency channel using time slices. Rather, in CDMA, multiple users are separated from each other by superimposing a user-specific high-speed code on the data of each user. Because the applied code has the effect of spreading the bandwidth of each user's transmission, the CDMA system is often called a "spread spectrum" system.

Initially, the user information is digitized so that the information is represented as a sequence of "0" and "1" bits. For modulation purposes, it is common to convert this sequence of information bits into a corresponding synchronous time signal having +1 and −1 values, where +1 corresponds to a bit value of "0" and −1 corresponds to a bit value of "1".

"Direct sequence" spreading typically is accomplished by multiplying a narrowband information signal by a much wider band spreading signal. The error and redundancy encoded digital data (speech) for each of the shared users of the CDMA channel may typically be provided at a rate of 19.2 kbps (kilobits per second). These data are then spread using a much higher frequency spreading signal, which may be provided at a rate of 1.2288 Mbps (megabits per second). Using the wider frequency spreading signal, a CDMA frequency channel can accommodate many users on code sub-channels.

In the IS-95B CDMA standard, the spreading signal is a sequence of bits selected from one of 64 different orthogonal waveforms generated using Walsh functions. Specifically, each such Walsh function typically consists of a repeating 64-bit sequence, and thus has a period of 52.083 μs (64 bits/1.2288 Mbps). A different one of the 64 different Walsh functions is utilized for each sub-channel to be included in the frequency channel. At the receiving end, a particular sub-channel can be decoded using the same Walsh function which was used to encode the sub-channel. When decoded in this manner, the desired sub-channel signal is reproduced and the signals from the other 63 sub-channels are output as low level noise. As a result, a user can distinguish its code sub-channel from other users'sub-channels on the same frequency channel.

A number of different types of sub-channels are frequently used in CDMA communications systems. For instance, the paging sub-channels are used to provide information to the mobile unit, such as instructions regarding which sub-channel to use to initiate a telephone call and information regarding code delay offsets for neighboring base stations. Data traffic signal sub-channels typically are used for voice communications during telephone calls, but can be used for other point-to-point data transmissions, as well.

In addition to the above-described sub-channel encoding, the various sub-channels also are processed using other types of coding. For instance, data on the paging and speech traffic sub-channels typically are scrambled using a repeating pseudo random bit sequence (long code) which is unique to each different mobile unit, and which typically has a period of $2^{42}-1$ bits. In order to coordinate long codes with the base station, upon initial registration with the base station the mobile station provides its serial number to the base station. The base station then uses that serial number to retrieve the mobile unit's unique long code from the base station's database. Thereafter, the two can communicate using scrambled data, so as to provide a certain amount of privacy.

In addition to scrambling, each sub-channel typically is encoded using an additional repeating pseudo random bit sequence (PN code). The PN code sequence, also referred to as the chipping function, utilized by a particular base station may be expressed as c(t), because it is applied as a function of time t. The PN code sequence is generated using a linear feedback shift register (LFSR) which outputs a pseudo random sequence of digital ones and zeros. These digital ones and zeros are converted to −1 and +1 symbols respectively and then filtered to give the chipping function c(t). Thus the chipping function has the property that $c(t)^2=+1$. The period of the PN code sequence generated by a N-register LFSR is $2^N-1$ bits (or chips) long, although it is common to insert a zero to extend the full sequence length to $2^N$ chips. Typically, the PN code is generated using a 15 bit code word and a 15-register LFSR, providing a repeating sequence of $2^{15}=32,768$ chips. Assuming the system uses the typical chip rate of 1.2288 megahertz (MHz), the sequence repeats every 26.666 ms.

Generally, the PN code is identical for all base stations in the cellular network. However, each base station typically applies the PN code using a different time delay from the other base stations. For example, each base station generally has designated to it one of 512 different offsets (spaced 64 chips apart) for use in applying its PN code. By utilizing different offsets in this manner, a mobile unit can selectively tune to any given base station merely by using the same offset as that base station. Accordingly, it can be seen that merely time shifting a PN code sequence in this manner produces the same result as if each base station were using an entirely different PN code.

Figure 1:
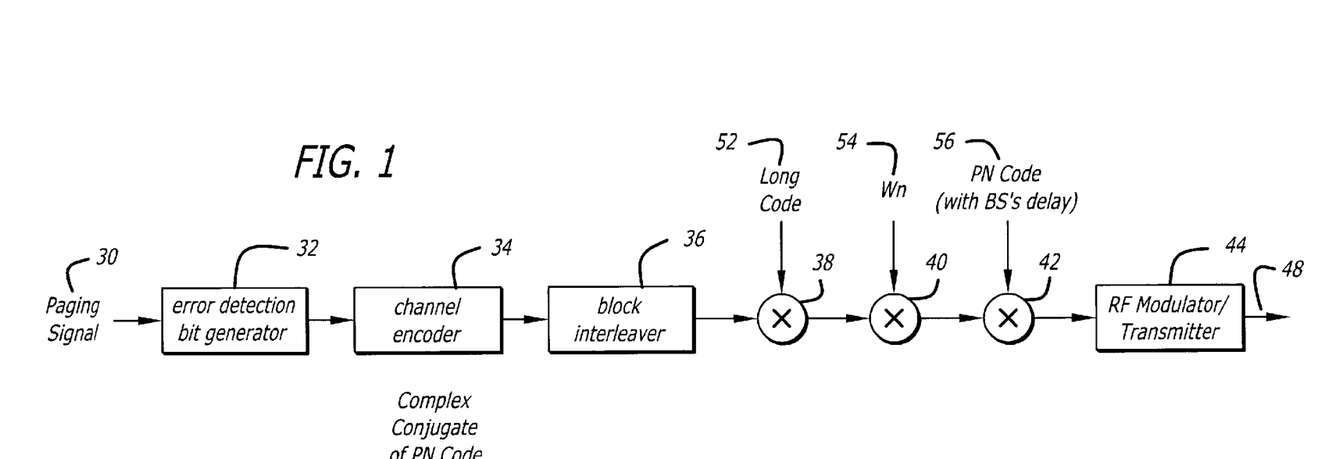
FIG. 1 is a simplified block diagram illustrating certain components related to data transmission from a base station in an IS-95B CDMA communications system.

FIG. 1 illustrates a block diagram of a portion of a base unit for explaining the generation of the forward link paging sub-channel signals. The paging data 30 typically is divided into 20 ms frames, with each frame including a number of information bits that depends on the data rate of the signal. For instance, a frame of data transmitted at 9600 bps typically will include 192 bits, of which only a portion of these generally will be information bits.

In error detection bit generator 32, error detection bits are generated and appended to the information bits. Typically, the error detection bits are provided in the form of a cyclic redundancy code (CRC), which is a linear error detection code that includes parity check bits generated by finding the remainder of a polynomial division. Typically, for each paging sub-channel message, 30 CRC bits are appended to the end of the message information bits. Thus, in this implementation a number (e.g., a fixed number, such as 30) of error detection (e.g., CRC) bits are associated with each message. It is noted, however, that it is also possible to associate a number of error detection bits with each data frame, rather than with each message. Frequently, additional zero bits (such as 4 or 8 zero bits) are appended (not shown) to the end of the frame so as to facilitate convolutional decoding.

In channel encoder 34, one or more of a number of redundancy encoding techniques, commonly termed "forward error correction coding" or "channel coding", are applied. These names refer to the fact that such codes allow for the correction of erroneous channel reception. For each digital bit of information, these codes generate some greater amount of "coded" bits.

The "rate" of a code refers to the number of coded bits generated from number of information bits. For example, if 40 information bits generate 80 coded bits, then the rate of the code is said to be ½. The simplest form of channel coding is repetition coding, wherein the coded bit stream with rate 1/N is generated by simply repeating each bit N times. By way of example and not of limitation, a repetition code is used here only for purposes of illustrating the concept of channel coding. There are many much more effective codes which can be used, such as various convolutional and block codes and other codes well-known to those skilled in the art.

An example of using rate ⅓ repetition coding on information bits is:

information bits: 1 0 1 0 1 1 1 0 . . .

rate ⅓ code bits: 111000111000111111111000 . . .

The most simple modulation scheme would modulate the code bits as positive or negative code symbols. As noted above, a digital 1 generally maps to an analog −1 and a digital 0 generally maps to an analog +1. The digital 0's and 1's are referred to as "bits," while the analog −1's and +1's are called "symbols." Thus, the modulation symbols from the above code bit sequence are:

symb −1 −1 −1 +1 +1 +1 −1 −1 −1 +1 +1 +1 −1 −1 −1 −1 −1 −1 −1 −1 −1 +1 +1 +1

In block interleaver 36, a frame of code bits is taken and the order of the bits reshuffled prior to actual transmission over the channel. As a result, a burst of errors over the channel is unlikely to make successful reception of an interleaved frame impossible. After interleaving, the code symbols corresponding to each information bit are no longer adjacent. Thus, a burst of channel errors will not necessarily affect all of the code symbols for a given information bit.

Considering the 24 code bit example of code repetition above, the interleaver pattern may, for example, be:

1 6 11 16 21 49 14 19 24 3 8 13 18 23 5 10 15 20 2 7 12 17 22

Thus, the first code symbol is transmitted first, followed by the sixth code symbol, then the eleventh code symbol, etc.

When combined with repetition or other forms of channel coding, interleaving provides resilience to "fading," a channel degradation common in mobile wireless environments. Fading is the temporary nulling out of the signal due to the self-interference of multiple radio path reflections. That is, the faded symbols will appear as 0 rather than +1 or −1, and thus will not affect the outcome. For example, if the last five symbols transmitted in the frame were "faded", then the code symbols 2, 7, 12, 17, and 22 would be received as zeros. Note that these correspond to the original first, third, fourth, sixth and eighth bits, but there remain other code symbols, unfaded, which may be used to determine the value of each of these bits. For example, code symbols 1 and 3 are not faded and can be used to determine the first information bit. In the above example with symbol 2 faded, the first bit would be found using the sum of symbols 1, 2 and 3 to give −1+0−1=−2=digital 0; there is no error from the fade. Note that in the presence of noise, all three symbols contribute noise terms, and there is a signal to noise degradation from the loss of the faded symbol.

The frame interleaved data are scrambled by multiplying the data by long code 52 in multiplier 38. Thereafter, the data are combined with a Walsh function 54 in multiplier 40 so as to modulate the desired signal onto the desired sub-channel n. Next, in multiplier 42, the output signal is combined with PN code sequence 56, which has the base station's designated time delay. Because the data are provided in signal form, they generally can be combined with long code 52, Walsh function 54 and PN Code 56 merely by multiplying the two signals together. However, if the data instead comprised sequences of bit data, the same result could be obtained by performing the exclusive-or function on the corresponding bits in the two sequences, rather than by performing multiplication.

Upon completion of the foregoing processing, the outputs of all the sub-channels are added and subsequently subjected to quadrature spreading and quadrature phase shift keying in RF modulator/transmitter 44 in order to modulate he combined signal to the appropriate radio frequency channel.

Figure 2:
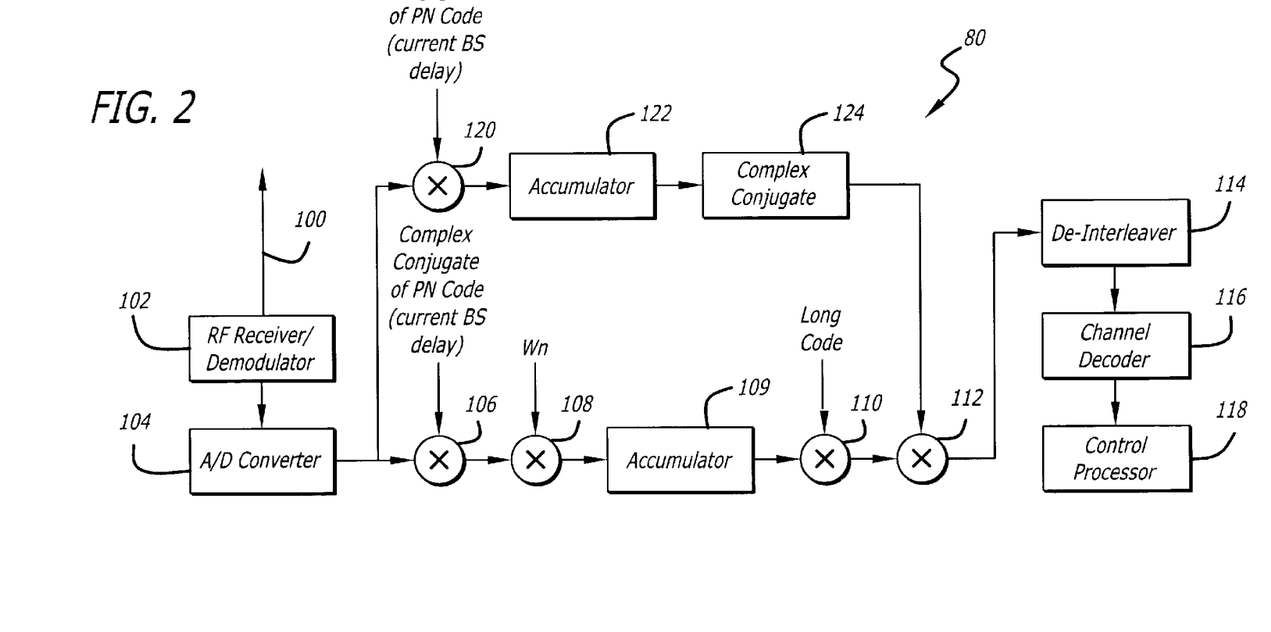
FIG. 2 is a simplified block diagram illustrating conventional mobile unit processing for reception during a slotted paging mode.

FIG. 2 illustrates a block diagram of the receiver portion of a conventional CDMA mobile unit 80. For the examples given in the following description, it is assumed that the receiver is operating in a slotted paging mode, during which the receiver receives data from the base station in 20 ms frames.

Included in the mobile unit 80 is an antenna 100 for receiving radio frequency signals, such as signals in the 800 MHz, 900 MHz or 1.9 gigahertz (GHz) ranges. As shown in FIG. 2, connected to antenna 100 is a RF receiver/demodulator 102 for removing the radio frequency carrier from incoming signals. RF receiver/demodulator 102 is part of the RF section of the mobile unit, which typically also includes a transmitter.

Connected to the output of receiver/modulator 102 is A/D converter 104 for sampling the demodulated analog signal and then quantifying each sampled signal level.

Multiplier 106 inputs the digital samples output from A/D converter 104 and multiplies those samples by the complex conjugate of the PN code sequence. Specifically, the complex conjugate of the PN code sequence is applied using the currently monitored base station's delay time, as determined during the initial acquisition process or during a subsequent search. As a result, the mobile unit 80 selectively tunes to transmissions only from the currently monitored base station. Other base stations' signals are output from multiplier 106 as pseudo-random noise.

Multiplier 108 multiplies the output of multiplier 106 with the Walsh function corresponding to sub-channel n, where n is the sub-channel number of the paging sub-channel of the current base station being monitored. As a result, the mobile unit 80 selectively tunes to transmissions only on sub-channel n. Other sub-channel signals are output from multiplier 108 as pseudo-random noise.

Accumulator 109 then converts the data from 1.2288 Mbps to the appropriate data rate, such as 19,200 bps. This is accomplished, in this example, by averaging or adding chip values over appropriate 64 chip sequences and then outputting the result for each 64 chip sequence. In the absence of channel noise, all 64 chips for the monitored sub-channel of the current base station would be identical. Even with some noise added, the sum of all 64 chips generally will still indicate the correct symbol. On the other hand, because the signals corresponding to all other sub-channels and all other base stations have been reproduced as pseudo-random noise, accumulating over 64 chip sequences tends to produce relatively low-level noise.

Multiplier 110 multiplies the output of accumulator 109 by the long code, thereby de-scrambling the data.

Multiplier 112 multiplies the output of multiplier 110 by a pilot signal. The pilot signal, in turn, has been formed by multiplying the output of A/D converter 104 by the complex conjugate of the PN code for the currently monitored base station in multiplier 120, accumulating over sequences of consecutive symbols in accumulator 122, and then taking the complex conjugate of the result in element 124.

De-interleaver 114 is connected to the output of multiplier 112, and includes a de-interleaving buffer (not shown) which accumulates an entire frame of data. After the entire frame has been received and stored in the de-interleaving buffer, de-interleaver 114 de-interleaves the data by reordering the samples into their original order.

Channel decoder 116 then reverses the channel coding. If simple repetition coding has been used, adjacent symbols corresponding to the same bit value can be simply added and then compared to zero, as described above. Generally convolutional encoding will have been performed. Accordingly, convolutional decoding will be performed by decoder 116. Sometimes, a combination of repetition coding and convolutional coding will have been used, and therefore both techniques must be employed in decoder 116.

Finally, the decoded frame data output from decoder 116 are input into control processor 118. Control processor 118 first examines the error detection bits to determine if a transmission bit error has occurred. If so, control processor 118 merely discards the message. On the other hand, if no error is detected, control processor 118 interprets the message from the base station and initiates appropriate processing in response to that message.

A mobile unit operating in a CDMA cellular communication system typically is capable of operating in several different modes. When initially powered up, the mobile unit immediately enters an acquisition mode, in which it attempts to "acquire" the base station having the strongest signal. Upon completion of such acquisition, the mobile unit then enters a mode in which it monitors communications from the acquired base station, typically on a paging sub-channel.

Because it is highly desirable for the mobile unit to conserve battery power and because continuous base station monitoring generally is not required, the CDMA system typically uses a "slotted paging mode". In the slotted paging mode, the base station only transmits messages to a particular mobile unit during discrete time slots. During all other time periods, the mobile unit can enter a power-saving sleep mode, in which the RF section is shut down. The mobile unit does, however, keep track of timing during the sleep mode. Just prior to the designated time slot, the mobile unit awakens from the power-saving sleep mode and powers up the RF section in preparation for receiving the message from the base station.

Figures 3, 6:
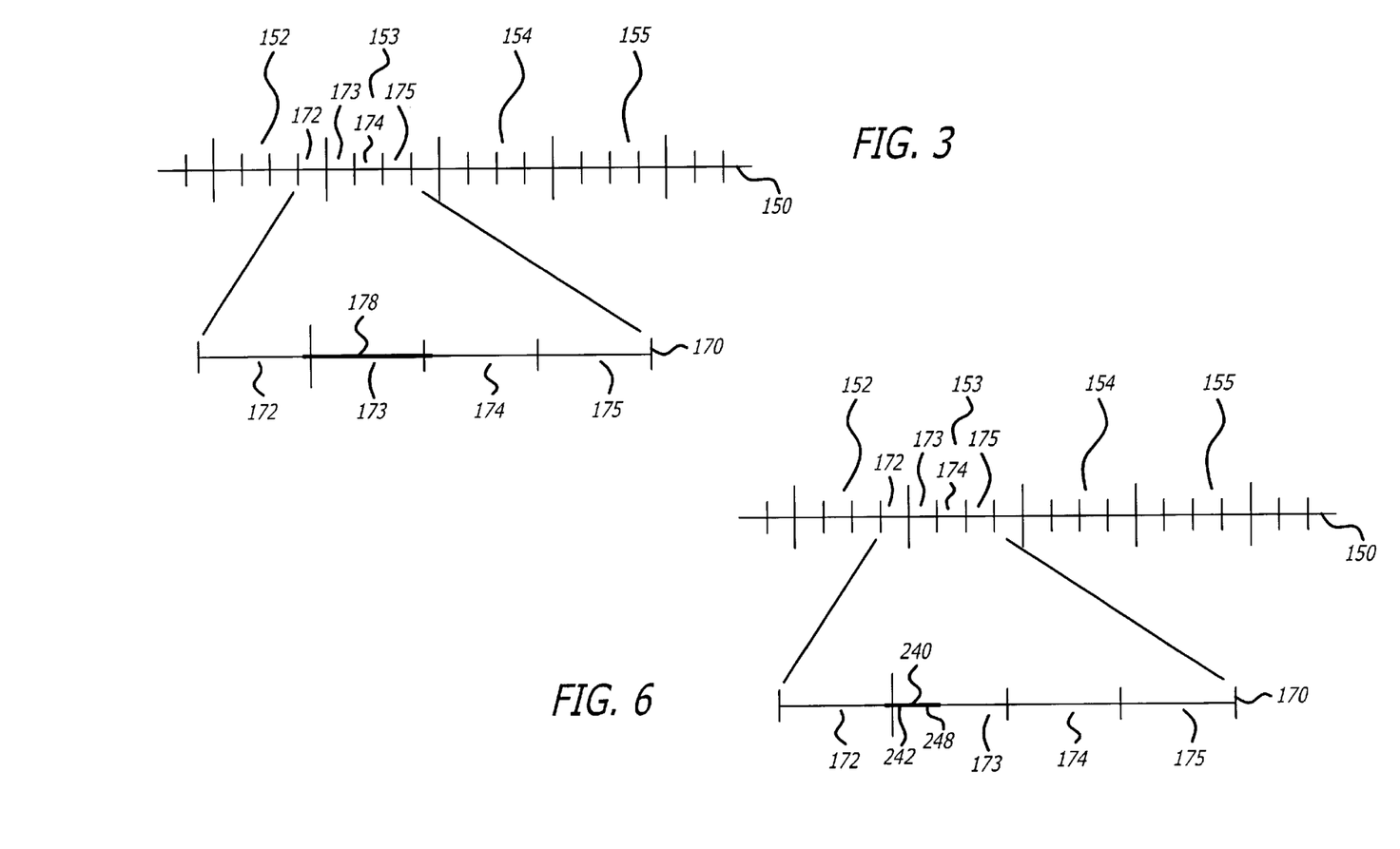
FIG. 3 illustrates a time line for slotted paging mode reception according to a conventional technique.
FIG. 6 illustrates an exemplary time line for slotted paging mode reception according to the present invention.

Mobile unit reception in the slotted paging mode has been described in detail above. FIG. 3 illustrates a time line 150 for reception in the slotted paging mode. As shown in FIG. 3, time line 150 is divided into a number of different time slots, such as slots 152 to 155. Each such slot includes a number of different data frames, such as frames 172 to 175. Time line 170 is an enlarged view of the portion of time line 150 that includes frames 172 to 175. It is assumed that slot 153 is the designated time slot, and that a release message is present in the first frame (173) of slot 153. A "release" message indicates to the mobile unit that no further processing is required and therefore the mobile unit can return to the power-saving sleep mode.

Based on the foregoing assumptions, time interval 178 indicates the time period during which the RF receiving section of the mobile unit must be powered up in the conventional technique. Specifically, the mobile unit awakens from the power-saving sleep mode and powers up just prior to the beginning of time slot 153. Then, as described above, the mobile unit receives and stores in the de-interleaver buffer all the data for frame 173. When the entire frame has been received, the mobile unit processes the data to identify the message. Once the mobile unit recognizes the release message, it begins powering down the RF section in order to return to the sleep mode. Typically, the power-down processing requires a certain amount of time. Therefore, the RF section remains on until some period of time after the end of frame 173.

While the foregoing conventional technique works for its intended purpose, an overriding concern in mobile unit design is to decrease energy consumption, thereby increasing mobile unit standby time for the same size battery.

SUMMARY OF THE INVENTION

The present invention addresses the foregoing need by supplementing a received portion of a frame of data to obtain a full frame of data and then processing the supplemented frame of data.

Thus, in one aspect, the invention is directed to decoding a message spread over a frame of encoded data. First, encoded data are received so as to obtain a quantity of the encoded data that is less than all the encoded data in the frame and also is less than all the encoded data representing the message. Then, the quantity of encoded data received is supplemented, without receiving additional encoded data, so as to obtain a frame of data. Typically, the data will be in the form of soft decisions and will be supplemented by zero padding the data, such as by initializing a frame buffer to all zeros and then overwriting the zero data with actual data as it is received. Finally, ordinary frame decoding is performed on the frame of data so generated, in order to decode the message.

By virtue of the foregoing arrangement, the present invention often can decode a message prior to receipt of a full frame of data, which typically is earlier than conventional techniques would permit. When used in a mobile unit in a cellular communications network, the present invention can often significantly improve standby time. Specifically, in the event of a release message, which is ordinarily the most common message received in the idle mode, the mobile unit frequently will be able to detect the message earlier and, therefore, return to the sleep mode sooner, than conventional techniques would permit. As a result, power consumption is reduced and standby time increased.

In more particularized aspects of the invention, the received information includes error detection bits, such as CRC bits, and the error detection bits are checked to determine if an error exists in the encoded data received. This can permit the invention to determine whether a decoded message is likely to be reliable. In even more particularized aspects of the invention, the process is repeated during receipt of the frame of data, with the quantity of received data increasing each time, until the error detection bits indicate that a bit error has not occurred. In this manner, the invention can attempt to decode the message at the earliest possible moment.

The foregoing summary is intended merely to provide a quick understanding of the general nature of the present invention. A more complete understanding of the invention can only be obtained by reference to the following detailed description of the preferred embodiment in connection with the accompanying drawings.

DETAILED DESCRIPTION OF THE PREFERRED EMBODIMENT(S)

Figure 4:
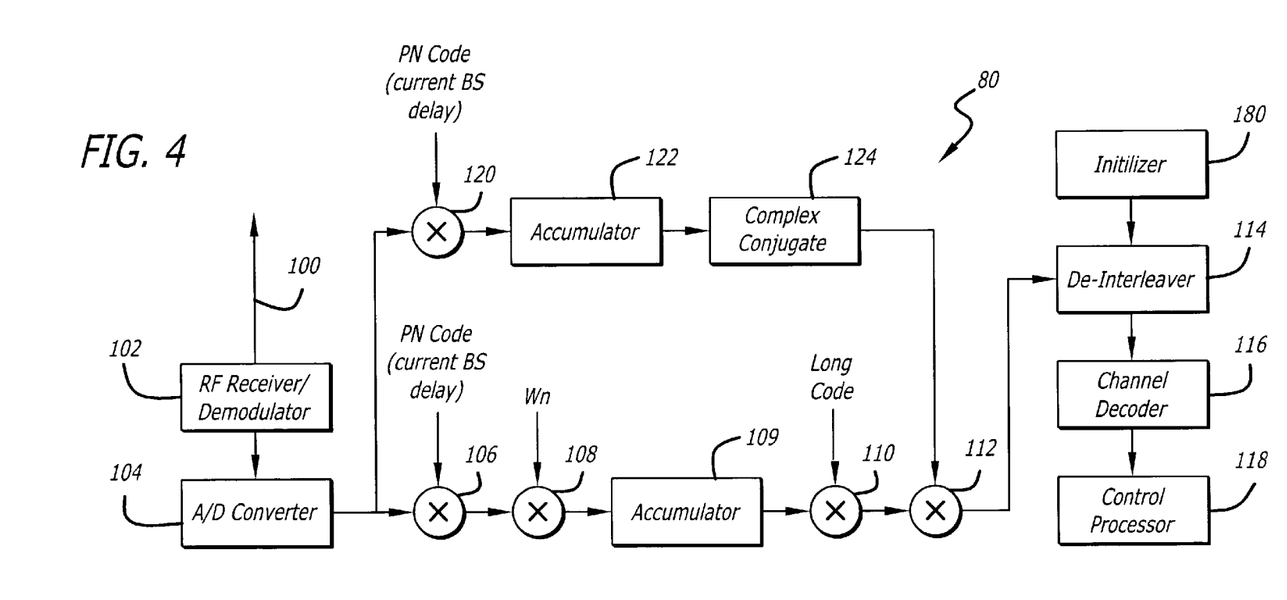
FIG. 4 is a simplified block diagram illustrating reception functions of a mobile communications unit operating in a slotted paging mode according to a representative embodiment of the present invention.

FIG. 4 is a simplified block diagram illustrating reception functions of a mobile communications unit operating in a slotted paging mode according to a representative embodiment of the present invention. Elements having the same reference numbers perform the same functions as corresponding elements shown in FIG. 2.

Specifically, antenna 100 receives radio frequency signals, preferably in the 800 MHz, 900 MHz or 1.9 GHz ranges. RF receiver/demodulator 102, which is part of the RF section of the mobile unit, removes the radio frequency carrier from incoming signals. A/ND converter 104 samples the demodulated analog signal and quantifies each signal sample. The signal is then combined with the PN code having the delay offset of the current base station in multiplier 106, in order to tune to the currently monitored base station. In multiplier 108, the signal is then combined with a Walsh code for the currently monitored paging sub-channel. In accumulator 109, fixed length chip sequences within the signal are then accumulated and output in order to convert the data rate, for example, from 1.2288 Mbps to the appropriate data rate, such as 19,200 bps, and to reduce the noise level relative to the signal level. Finally, in multipliers 110 and 112, respectively, the signal is combined with the long code used by the base station so as to de-scramble the received data and then combined with the pilot signal.

The output of multiplier 112 is supplied to de-interleaver 114. Also connected to de-interleaver 114 is initializer 180 for initializing the de-interleaver buffer to all zeros. De-interleaver 114 de-interleaves the data by reordering the samples into their original order. Channel decoder 116 then reverses the channel coding, as described above. The decoded data signal is then supplied to control processor 118 for message identification and processing. Additional functions of control processor 118 in the preferred embodiment of the invention are described in more detail below, with reference to FIG. 5.

Figure 5:
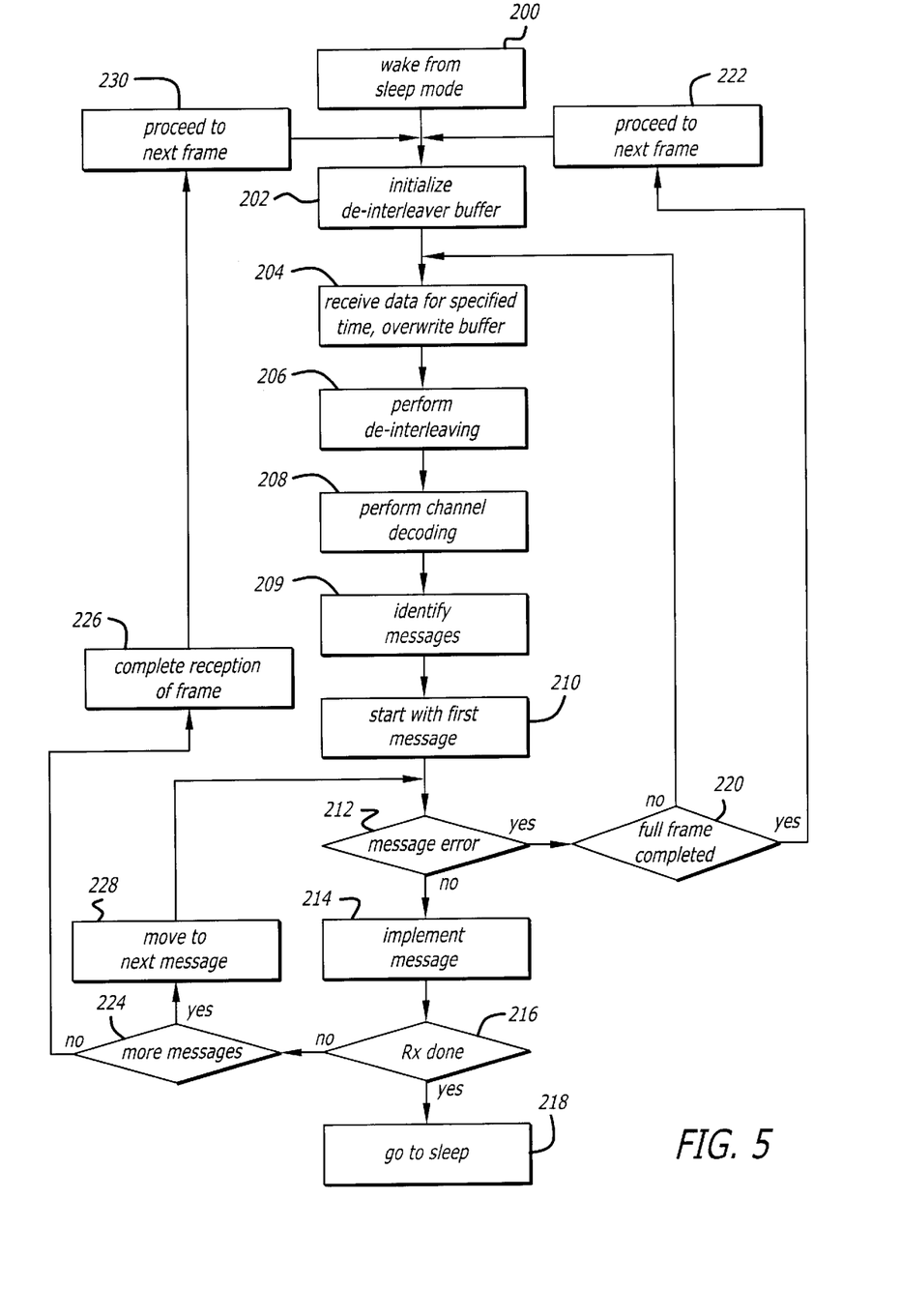
FIG. 5 is a flowchart illustrating mobile unit processing during the slotted paging mode according to the preferred embodiment of the present invention.

FIG. 5 is a flow diagram which illustrates mobile unit operation in the slotted paging mode according to a preferred embodiment of the invention.

In step 200, the mobile unit awakens from the power-saving sleep mode. In step 202, prior to receiving data for a given frame, the de-interleaver buffer is initialized to all zeros. Preferably, such initialization is performed by initializer 180 which may, for example, be a separate programmable gate array which initializes the de-interleaving buffer upon receiving an initialization instruction from control processor 118. Alternatively, control processor 118 may directly initialize the de-interleaving buffer.

In step 204, the mobile unit receives data (e.g., symbols) for a specified period of time. In the preferred embodiment, this period of time is fixed, but instead can be varied based on system or data parameters. Generally, the received data will be somewhat different than the transmitted data, due to the transmission channel degradation. As such data are received and output from multiplier 112, the received data overwrite the zeros in the de-interleaving buffer.

In step 206, prior to reception of the full frame of data, de-interleaver 114 begins de-interleaving the data in the de-interleaving buffer. Specifically, at this point, the de-interleaving buffer will be partially filled with received data, and the remainder of the de-interleaving buffer will be set to all zero values.

In step 208, the output of de-interleaver 114 is supplied to decoder 116 and the data are channel decoded.

In step 209, the messages are identified and then in step 210 the first message is examined.

In step 212, the error detection bits associated with the current message are evaluated, preferably in control processor 118, in order to determine whether a transmission error has occurred with respect to the current message. If not, then processing proceeds to step 214. It is noted that, with 30 CRC bits, the likelihood of getting an erroneous CRC match is $2^{-30}=9.3\times10^{-10}$, which is negligible.

If, however, a bit error has occurred, processing proceeds to step 220. In step 220, it is determined whether a full frame has been received. If so, processing proceeds to step 222 to process the next frame. If not, processing returns to step 204 to receive more data for the current frame.

In step 214, any actions required by the mobile unit in response to the current message are implemented, preferably by control processor 118.

In step 216, it is determined whether reception is completed, meaning that the mobile unit can return to the sleep mode. This condition can be satisfied in several different ways. For example, reception will be completed if the current message is a release message or if the mobile unit has received a predetermined number of consecutive frames (such as 8) that do not include a message requiring a response from the mobile unit. If it is determined that reception is completed, that processing proceeds to step 218 to return to the sleep mode.

Otherwise, processing proceeds to step 274 to determine whether more messages still need to be processed. If so, the next message is selected in step 228 and then processing returns to step 212. If not, the remainder of the frame is received in step 226, processing advances to the next frame in step 230, and then the interleaver buffer is again initialized in step 202.

In short, the processing illustrated in FIG. 5 performs de-interleaving and channel decoding prior to receiving a full frame of data by supplementing the received data, preferably with zero values. Due to the channel coding, which introduces a certain amount of redundancy, the full message often will be able to be decoded prior to receiving the full frame of data. By ignoring certain of the redundant data, the likelihood of a channel error is increased somewhat. However, by checking the appended error detection bits, it usually can be determined whether a bit error has occurred. If so, additional data can be received in an attempt to overcome the bit error. The foregoing steps of receiving additional data and then testing for a bit error can be repeated several times prior to receiving the complete frame of data. At each iteration, the data become more and more reliable.

How much earlier the technique according to the present invention will be able to identify a release message will depend upon the quality of the data received. However, by checking multiple times throughout the frame, the present technique can attempt to identify the message at the earliest possible time. Accordingly, on average, the technique according to the present invention will identify such messages earlier, thereby permitting the mobile unit to return to the power-saving sleep mode earlier.

This situation is illustrated in the time line shown in FIG. 6. Specifically, FIG. 6 shows a similar time line to that shown in FIG. 3. Here, however, the time that the RF section needs to be powered up 240 is shorter than the time 178 required in many conventional techniques. Similar to the conventional technique, the technique according to the present invention powers up the RF section just prior to the beginning of frame 173. However, rather than waiting until the end of frame 173, the technique according to the present invention checks the data at time point 242. In this example, it is assumed that the CRC bits indicate a bit error when only the data received up to time point 242 (together with zero padding for the portion of the message data not yet received) is processed. Accordingly, additional data are received and then the data up through time point 248 (again, with zero padding) are analyzed. At this point, sufficient additional data have been input to overcome the bit error in the original data sample. Accordingly, the mobile unit recognizes the release message at time point 248 and then immediately begins powering down the RF section. Therefore, shortly after time point 248, the mobile unit has returned to the power-saving sleep mode.

Comparing FIG. 3 to FIG. 6, it can be seen that the RF section is powered up for a significantly shorter time when using the technique of the present invention. As a result, power consumption is significantly decreased and standby time is correspondingly increased. Because the RF section of a mobile unit typically requires much more power consumption than the data processing portions, a significant reduction in the amount of power-up time for the RF section typically can significantly decrease the required power consumption of the mobile unit. It is also noted that additional power can be saved by shutting down some of the digital portions of the receiver during the sleep mode, as well. However, at least a sleep timer or counter generally will have to remain active during the sleep mode.

The present invention thus can permit faster decoding of an instruction where data corresponding to the instruction, or the energy of such data, is spread over an entire frame of data. By using error detection, the present invention can determine whether there appears to be an error in the received message. Then, when the energy spreading includes redundancy encoding, the present invention can adaptively check at various time intervals to determine whether enough data have been received to overcome the earlier error.

In the embodiment described above, the technique according to the invention checks periodically during a frame of data to determine whether a valid message has been received. As a result, the invention often can permit the receiver to return to the power-saving sleep mode before a full frame of data has been received. It should be noted that this is a typical result for a zero-tailed system, such as described above. When zero tailing is not employed, conventional techniques generally require the next full frame of data to be received before the message can be decoded. With no zero tailing, the present invention can periodically check during the next frame, thereby often avoiding the necessity of having to receive the entire next frame.

Although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiment shown in the drawings and described in detail hereinabove. Rather, it is intended that all such variations not departing from the spirit of the invention be considered as within the scope thereof as limited solely by the claims appended hereto.

In the following claims, those elements which do not include the words "means for" are intended not to be interpreted under 35 U.S.C. §112¶6.

What is claimed is:

1. A method for decoding a message having its energy spread over a frame of encoded data, said method comprising:

(a) receiving encoded data to obtain a quantity of the encoded data that is less than all the encoded data in the frame and also is less than all the encoded data representing the message;

(b) supplementing the quantity of encoded data received, without receiving additional encoded data, so as to obtain a frame of data; and (c) performing ordinary frame decoding on the frame of data generated in step (b), in order to obtain decoded message data.

2. A method according to claim 1, wherein error detection bits also are encoded in the encoded data, wherein the error detection bits are associated with a message; wherein step (c) also decodes the error detection bits, and wherein said method further comprises a step of checking the error detection bits to determine if the decoded message data include a bit error.

3. A method according to claim 2, wherein steps (a) through (c) are repeated until the first to occur of: (1) a valid message is obtained, based on the error detection bits, and (2) a full frame of data is received; and wherein with each repetition of step (a), the quantity of data received is increased by newly received data.

4. A method according to claim 1, wherein error detection bits also are encoded in the encoded data, wherein the error detection bits are associated with the frame of data, and wherein said method further comprises a step of checking the error detection bits to determine if the frame includes a bit error.

5. A method according to claim 4, wherein steps (a) through (c) are repeated until a valid frame is obtained; and wherein with each repetition of step (a), the quantity of data received is increased by newly received data.

6. A method according to claim 1, further comprising steps of:

receiving additional encoded data so that the quantity of encoded data received is now greater than in step (a); and repeating steps (b) and (c) with said greater quantity of encoded data.

7. A method according to claim 1, wherein the encoded data have been encoded using redundancy encoding and interleaving, and wherein the ordinary frame decoding in step (c) includes de-interleaving and redundancy decoding.

8. A method according to claim 1, wherein step (b) is performed by zero-padding the encoded data received to the end of the frame.

9. A method according to claim 8, wherein the zero-padding in step (b) is accomplished by initializing a frame buffer to all zeros.

10. A method for decoding a message that has its energy spread over a frame of encoded data which has been encoded using redundancy encoding and interleaving, said method comprising:

(a) receiving encoded data to obtain a quantity of the encoded data that is less than all the encoded data in the frame and also is less than all the encoded data representing the message;

(b) supplementing the quantity of encoded data received, without receiving additional encoded data, so as to obtain a frame of data; and (c) performing de-interleaving and redundancy decoding on the frame of data generated in step (b), in order to decode the message.

11. A method according to claim 10, wherein error detection bits also are encoded in the encoded data, wherein step (c) also decodes the error detection bits, and wherein said method further comprises a step of checking the error detection bits to determine if an error exists in the encoded data received.

12. A method according to claim 11, wherein steps (a) to (c) are repeated until the first to occur of: (1) a valid message is obtained, based on the error detection bits, and (2) a full frame of data is received; and wherein with each repetition of step (a), the quantity of data received is supplemented by newly received data.

13. A method according to claim 11, wherein the error detection bits are cyclic redundancy code (CRC) bits.

14. A method according to claim 10, further comprising steps of:

receiving additional encoded data so that the quantity of encoded data received is now greater than in step (a); and repeating steps (b) and (c) with said greater quantity of encoded data.

15. A method according to claim 10, wherein step (b) is performed by zero-padding the encoded data received to the end of the frame.

16. A method according to claim 10, wherein the redundancy encoding comprises channel encoding.

17. An apparatus for decoding a message spread over a frame of encoded data, said apparatus comprising:

receiving means for receiving encoded data to obtain a quantity of the encoded data that is less than all the encoded data in the frame and also is less than all the encoded data representing the message;

supplementing means for supplementing the quantity of encoded data received, without receiving additional encoded data, so as to obtain a frame of data; and decoding means for performing ordinary frame decoding on the frame of data generated by said supplementing means in order to decode the message.

18. An apparatus according to claim 17, further comprising means for awakening said apparatus from a power-saving sleep mode and means for returning to the power-saving sleep mode if the message is a release message.

19. An apparatus according to claim 18, wherein said receiving means is shut down during said power-saving sleep mode.

20. An apparatus according to claim 17, wherein said apparatus is a mobile unit for receiving signals in a code division multiple access (CDMA) cellular communications system.

* * * * *